United States Patent [19]
Bruce et al.

[11] Patent Number: 6,086,926
[45] Date of Patent: Jul. 11, 2000

[54] MANUFACTURE OF PASTA FILATA CHEESES

[75] Inventors: Graham Bruce; Denise Pawlett, both of London, United Kingdom

[73] Assignee: Imperial Biotechnology Limited, London, United Kingdom

[21] Appl. No.: 09/230,236

[22] PCT Filed: Jul. 21, 1997

[86] PCT No.: PCT/GB97/01957

§ 371 Date: May 6, 1999

§ 102(e) Date: May 6, 1999

[87] PCT Pub. No.: WO98/03073

PCT Pub. Date: Jan. 29, 1998

[30] Foreign Application Priority Data

Jul. 19, 1996 [GB] United Kingdom ................ 9615229

[51] Int. Cl.[7] .................................................. A23C 19/032
[52] U.S. Cl. ................................................ 426/36; 426/42
[58] Field of Search ........................... 426/36, 42, 38, 426/39, 40, 582

[56] References Cited

U.S. PATENT DOCUMENTS 3,975,544  8/1976  Kosikowski ........................ 426/35

FOREIGN PATENT DOCUMENTS

WO 91/13553  9/1991  WIPO .

OTHER PUBLICATIONS

B. Law: "Accelerated Cheese Ripening With Food Grade Proteinases", Journal of Dairy Research, vol. 49, No. 1, 1982, pp. 137–147.

C. J. Oberg et al: "Effects of Milk–Clotting Enzymes on Physical Properties of Mozzarella Cheese", Journal of Dairy Science, vol. 75, No. 3, 1992, pp. 669–675.

C. J. Oberg et al: "Effects of Proteolytic Activity of Thermolactic Cultures on Physical Properties of Mozzarella Cheese", Journal of Dairy Science, vol. 74, No. 2, Feb. 1, 1991, pp. 389–397.

V. Sciancalepore et al: "A No Brine Method for Mozzarella Cheese Making, Impact on Chemical Composition and Proteolysis", Milchwissenschaft, vol. 50, No. 9, Sep. 1, 1995, pp. 496–498.

Malin et al., Chemistry of Structure–Function Relationships in Cheese; Plenum Press, pp. 33–35, 316, 319, 1995.

Scott, R., Cheese making Practice; Elsevier App. Sci. Publishers, pp. 234–239, 479–481, 1986.

Fox, P. Cheese: Chemistry, Physics and Microbiology, vol. 2, Elsevier App. Sci. Pubishers, pp. 228–233, 1987.

*Primary Examiner*—Keith D. Hendricks
*Attorney, Agent, or Firm*—Harness, Dickey & Pierce, P.L.C.

[57] ABSTRACT

Pasta filata cheeses, such as mozzarella, are made in the conventional way, except that the conventional step of heating and stretching is replaced by treatment with a proteolytic enzyme, thereby providing for significant economies in manufacture. Brine treatment may also be replaced by dry salting in this method.

9 Claims, No Drawings

MANUFACTURE OF PASTA FILATA CHEESES

This application is a 371 of PCT/GB97/01957, filed Jul. 21, 1997.

FIELD OF THE INVENTION

The present invention relates to improved processes for the production of cheeses of the pasta filata type.

BACKGROUND OF THE INVENTION

The most important of the pasta filata cheeses is mozzarella, which may be made from buffaloes' milk, cows' milk or a mixture of the two and which can be produced in several varieties as described in more detail below. Because of the importance of the mozzarella cheeses, the invention is hereafter principally described with reference to its use in the production of mozzarella, but it may also be applied mutatis mutandis to the production of other pasta filata cheeses, including Scarmorza, Scamorzina, Provola, Burrino, Manteca, Provolone which may be produced in several shapes having different names (e.g. Topolino, Pancetta, Pancettone, Mandarino), Caciocavallo, Ragusano and Silano, differing from one another in the duration of ripening and consistency.

Conventional mozzarella and other pasta filata type cheeses are characterised by a unique plasticising and kneading treatment, which is carried out on the fresh curd in hot water. This treatment imparts to the finished cheese its characteristic stretching and melting properties, as well as its fibrous structure.

The primary use of mozzarella is in cooking, and it is the preferred cheese for pizza. Pasta filata cheeses are also used, for example, as a snack food in the form of short sticks popularly known as "string cheese". Mozzarella is also often consumed fresh as a table cheese. High moisture mozzarella is typically used fresh and low moisture mozzarella is more suitable for shredding and use in food service.

There are several methods for the manufacture of pasta filata type cheeses, but all have certain features in common. Typically, a starter culture is added to pasteurised milk. Sufficient rennet is subsequently added, to set the curd. The resulting coagulum is cut, scalded (cooked) at about 30° C. to 40° C., cheddared, and then subjected to the plasticising process at a temperature in the range of 55° C. to 75° C. The hot plastic curd is then moulded into the desired shape, and salted and cooled in chilled brine for approximately 2 to 24 hours. After the brining step, mozzarella cheese is traditionally aged for 7 to 21 days to develop the characteristic texture and functionality. High moisture mozzarella may be made using a mesophillic starter and cooking to 32° C. to 35° C. Mozzarella intended for use as a pizza ingredient is not necessarily aged for as long as 7–21 days but, instead, is conventionally aged at most overnight, after which it is shredded, and then frozen, to be kept until it is needed.

A widely practised alternative to using a starter culture in the manufacture of both high and low moisture mozzarella is direct acidification. This typically involves the addition of an organic or inorganic acid, usually acetic acid, although lactic, citric and hydrochloric acids are all used in the trade. Acid precursors, such as gluconodelta lactone (GDL), which slowly breaks down to produce lactic acid, may also be used.

Numerous attempts have been made to improve the stage of manufacture where working and stretching of the raw curd is required. These attempts have been largely of a mechanical nature.

U.S. Pat. No. 3,692,540 describes a method where the curd is held in the whey until the acidity reaches 0.25–0.30%, and the raw curd pieces are then heated without working at a temperature of 54° C.–71° C.

U.S. Pat. No. 5,431,931 discloses a method for making low fat mozzarella where cultured skimmed milk is added to the cheese milk so that the amount of rennet can be reduced by one half. The cheese is then worked and stretched at 60° C.

EP-A-535 268 discloses a method to reduce the ageing time of mozzarella cheese by controlling the composition of the cheese and preferably mixing salt with the raw curd prior to the heating-stretching step.

The ageing period can also be shortened by the addition of sodium citrate (CZ-A-141,283) and by injecting a pre-gastric esterase solution (Lee et al, 1978, Process Biochemistry).

International patent application WO91/13553 discloses a method wherein *Bacillus licheniformis* protease is used to improve the meltability of Mozzarella made using ultra-filtered milk. The protease degrades whey proteins without interfering with the renneting process.

Stretching in mozzarella cheese is thought to require free calcium in association with the unravelling of the complex protein structure induced by heating. Meltability is both related directly to moisture and fat contents as well as salt concentration (Kindstedt, 1993, Critical Reviews in Food Science and Nutrition).

Oberg et al (J Dairy Science 1992) investigated the effect of different forms of rennet on the functionality of Mozzarella cheese and showed that stretch was significantly affected by the rennet used and storage time. Porcine pepsin produced cheese with the greatest stretch.

Oberg et al (J Dairy Science 1991) investigated the effect of proteolytic activity in starters typically used for Mozzarella manufacture. They found that protease positive starters produced Mozzarella with increased browning and stretch compared with direct acidified cheese, but with no difference in stretch between protease positive and protease negative starters. All cultured cheese had greater stretch than direct acidified cheese.

Thus, the literature identifies that proteolysis has an effect on functional properties but makes no clear conclusions from sometimes conflicting observations.

SUMMARY OF THE INVENTION

It is thus an object of the present invention to provide a more commercially attractive process for the preparation of pasta filata cheeses.

We have now surprisingly discovered that treatment with a proteolytic enzyme at or before the curd stage allows the plasticising step to be omitted, with consequent improvements in the economy and efficiency of the manufacturing process.

Thus, in a first aspect, the present invention provides a process for the production of a pasta filata cheese, wherein the plasticising step is omitted and replaced by treatment with a proteolytic enzyme in an amount and under conditions such as to impart stretching properties to the finished cheese, the enzymatic treatment being at the same time as or prior to any salting step.

DETAILED DESCRIPTION OF THE INVENTION

The process of the present invention allows the hot plasticising and stretching step, which is otherwise characteristic of this type of cheese, to be eliminated, thereby facilitating the manufacturing process and improving the economy of the process.

The step of adding enzyme may be at any convenient time prior to the stage at which it would be expected to subject the coagulum to the plasticising step. Thus, the enzyme may be added to the milk, even prior to the addition of the starter culture, or prior to direct acidification, as the case may be. Enzyme may also be added together with the rennet or, in a preferred embodiment, is added to the curd resulting from rennet treatment.

It will be appreciated that distribution of the enzyme should be as even as possible, so that it is generally preferable to stir, or otherwise agitate, the mix to encourage distribution of enzyme. For example, when adding the enzyme to the curd, stirring may be effected continuously during addition of enzyme and maintained for as long as desired thereafter although, with a slow even rate of addition, which is preferred, no extra stirring is required. The resulting treated curd can then be pressed.

The pressed curd can then be subjected to the usual brine treatment. However, it is an advantage of the present invention that treatment with brine can be avoided, and that the salt can be added directly to the curd. Where enzyme is also added to the curd, then it is advantageous to add the enzyme and salt together, in a mixture. This may be effected over any suitable period, but we generally prefer that such addition take between 5 and 45 minutes, preferably between 10 and 30 minutes, and especially about 30 minutes.

It will be appreciated that the pasta filata cheeses produced in accordance with the present invention may generally be prepared by any method known in the art, with the exception that it is possible to plasticise the cheese without having to heat and knead the curd. For example, the curd may be prepared with low fat milk and, if desired, by using direct acidification, rather than using a starter culture. Although it is possible to use heating and kneading to plasticise the cheese, it is preferred to forego these steps for the sake of efficiency.

In a preferred embodiment, the present invention provides a process for the production of a pasta filata cheese by fermenting milk, preferably pasteurised milk, with a starter culture, adding sufficient rennet to set the resulting curd, cutting, scalding and cheddaring the resulting coagulum, plasticising the cheddared product, together with salting and, if necessary, cooling the plasticised product, characterised in that the plasticising step is replaced by treatment with a proteolytic enzyme in an amount and under conditions such as to impart stretching properties to the finished cheese, the enzymatic treatment being at the same time as or prior to salting.

The invention constitutes a method for the manufacture of mozzarella cheese without the need for the cooking/stretching process. Proteolytic enzymes are added which, it is believed, alter the casein molecule and produce mozzarella cheese with full stretching characteristics. The advantages of omitting the cooking stretching process include: simplified equipment required for production of mozzarella and other pasta filata cheeses; savings on heating costs for the cooking-stretching process; cooling of curd not being required, saving energy costs and time; and ability to add heat sensitive ingredients or flavourings to the mozzarella curd. The process imparts greater product consistency by permitting the controlled, even addition of salt and enzymes (and avoiding the brining and cooling steps which create a cheese of variable composition) to complete the ripening process.

It will be appreciated that, preferably, following the enzymatic treatment of the present invention, the cheese is dry salted.

The process of the present invention, especially with dry salt application, allows the manufacture of functional Mozzarella type cheese. This method negates the use of the cooker-stretcher stage and also obviates the need for a brine bath.

The invention can be applied to high and low moisture pasta filata type cheese; low fat varieties; and direct acidified cheese, including any of the types described above, preferably mozzarella.

It will be appreciated that it is only necessary to use one protease, but that as many proteases as desired may be employed in the present invention. The enzyme employed may be any food grade proteolytic enzyme, of which many are known in the art. Preferred examples of such enzymes which may be employed include: such neutral proteases as those derived from *Bacillus subtilis,* including Neutrase (available from Novo Nordisk), Protease N (available from Amano), Protease B 500 (available from Gist Brocades) and Protease B 200 (available from Rhone Poulenc); those derived from *Aspergillus oryzae,* such as Protease 2A (available from Amano), Corolase 7092 (available from Rohm GMBH), Protease LP (available from Gist Brocades) and Flavorzyme (available from Novo Nordisk); bacterial alkaline proteases, including those from *Bacillus licheniformis* (Alcalase, available from Novo) and *Bacillus subtilis* (Maxatase, available from Genecorp); acid proteases, including fungal acid proteases (Amano protease A, from *Aspergillus niger*); and microbial rennets (Fromase, available from Gist Brocades, from *Mucor miehei;* Emporase, available from SBI, from *Mucor pusillus;* and Surecurd, available from SBI, from *Cryphonectria parasitica*).

The amount of enzyme is not critical to the invention, although it will be appreciated that the amount employed will have an effect on the nature and quality of the final product. Preferably, the amount of enzyme is so chosen that, under the reaction conditions employed, notably the time and temperature, the resulting product is functionally identical to the conventional product, and that this may readily be determined by simple trial and error using the guidelines given hereinunder.

The main enzymatic reaction takes place when the curd is still in the vat and during pressing. The temperature employed during this period is preferably within the range from 15° C. to 40° C., more preferably from 20° C. to 30° C. The time for which the product is held at this temperature is preferably within the range from 3 hours to 48 hours, more preferably from 6 to 24 hours, and most preferably overnight. The quantity of enzyme for use within these temperature and time ranges is then preferably within the range from 0.0005 to 0.015 Anson units per kg curd, more preferably from 0.002 to 0.0085 Anson units per kg curd, and most preferably about 0.004 Anson units per kg curd.

Pilot scale trials were held with a view to produce functional (stretching, melting and oiling) mozzarella type cheese. Functionality is most advantageously achieved by the application of protease type enzymes direct to the curd with the salt. The salted and enzyme treated curd is then moulded and pressed overnight. After coming out of the mould the cheese is stored, as is conventional, for a period of up to 3 weeks to assess its functionality and the effect on shelf life.

A preferred method for the manufacture of mozzarella cheese is as follows:

Mozzarella curd was manufactured in the standard manner utilising a standard mozzarella culture, chymosin and standardised milk. After coagulation, cutting and scalding the curd, particles were transferred to the table to allow for dry stirring acid development. Acidity was allowed to develop to standard levels (pH 5.2–5.4) and the curds milled.

Normal manufacture would then take the form of the curds being transported through a cooker-stretcher stage which traditionally imparts the functionality into the final cheese. This stage also decreases the number of starter organisms present. After the cooker-stretch stage the molten curd mass is filled into moulds which are then passed into a brine bath. This has the two-fold purpose of cooling the cheese and allowing for salt penetration via osmosis, which helps maintain microbial stability. After brining the cheeses are then stored until required.

Our production method differs from the standard in that, after milling, the curds are left on the table ready for salt/enzyme treatment. Quantities of enzyme are mixed with the salt (normal salt levels are in the range 2–3% but can be as low as 1% w/w) and then applied to the curd as per the normal dry salting technique. Quantities of enzyme generally vary between 0.002 to 0.0085 Anson units per kg curd.

After allowing a period of time for salt and enzyme incorporation (mellowing), the salted curds are then filled into moulds and then placed into a cheese press where they are left, typically, overnight. The following day the cheeses are removed from the moulds and then stored until required.

Functionality of the cheeses, both enzyme treated and non enzyme treated, were compared against product manufactured via the standard method. Samples were taken at days 3, 7, 14 and 21.

Functionality was assessed by cooking 25 g of the cheese in question at 220° C. for 10 minutes and then recording appearance for browning and oiling. After being taken out of the oven, the cheese was allowed to cool for 3 minutes, and then stretch was measured by prodding a metal knife into the molten mass and then drawing the implement upwards in a smooth and steady manner. Stretch, in terms of both distance and thickness, was observed and recorded.

Functionality was also assessed by baking trials, in that the cheeses under observation were placed on top of pizza and then passed through a pizza oven and the pizza then sliced and a portion removed. Again observations of browning and oiling were also made.

Cheese manufactured via the use of dry salt/enzyme application exhibited enhanced functionality properties as compared to cheese manufactured via the cook and stretch method and also to cheese made via dry salt application only.

This enhanced functionality was also observed in the baking trials.

Stretch of Samples

The samples employed in this test were prepared as illustrated hereafter in Example 1. The stretch was observed as described above. The results are shown in Table 1 below.

TABLE 1

| Sample | Day 3 | Day 7 | Day 14 | Day 21 |
| --- | --- | --- | --- | --- |
| Cooker-stretched | 300 mm (12") | 360 mm (14") | 510 mm (20") | 360 mm (14") |
| No treatment | 130 mm (5") | 230 mm (9") | 280 mm (11") | 250 mm (10") |
| Bacillus subtilis neutral protease 0.0085* | 380 mm (15") | 300 mm (12") | 460 mm (18") | 460 mm (18") |
| Aspergillus oryzae neutral protease 0.002* | 230 mm (9") | 200 mm (8") | 330 mm (13") | 480 mm (19") |

Results are also shown in the originally measured inches (") next to the SI unit results.

It can be seen from the above results that the mozzarella cheese of the present invention performed as well as, and sometimes better than, conventional mozzarella which had been subjected to the traditional Cooker-stretching process.

The invention will now be further illustrated by the following, non-limiting Examples.

EXAMPLE 1

Raw milk was standardised to a casein:fat ratio of 1.2:1 followed by pasteurisation at 72° C. for 16 seconds and cooled to 38° C. Bulk starter culture was added at 1% v/v of the milk volume. The starter was a mixture of *Streptococcus thermophilus* and *Lactobacillus bulgaricus*. The milk was ripened for 45 minutes. During ripening the pH decreased from 6.62 to 6.45. At the end of fermentation, chymosin (Maxiren 15L, Gist Brocades) was added at 1.8 liters per 10,000 liters milk. After 30 minutes setting time the coagulum was cut with 1.2 cm wire knives and allowed to heal for 5 minutes. After healing, the curd was stirred for 10 minutes or until the whey had reached pH 6.2, and then the whey was drained. The curd was stirred during and after draining until the pH reached 5.5, a period of 1 hours 40 minutes after rennet (chymosin) addition.

A *Bacillus subtilis* neutral protease enzyme, Novo Neutrase, was mixed with the salt and added to the curd at a dose rate of 0.00825 Anson units (AU) per Kg curd. The curd was salted by hand at 2.2% salt w/w curd. The curd was continuously stirred during salting, which took approximately 15 minutes, and was maintained during this period at a temperature of about 30° C. After salting the curd was stirred for a further 5 minutes (for mellowing). The pH of the salted curd was about 5.3.

The curd was then packed into moulds and pressed overnight at 280 kPa (40 lbs/inch$^2$) and at ambient temperature (about 22° C.).

EXAMPLE 2

Cheese was made in a similar manner to that of Example 1, except that pasteurised full fat milk (4% fat) was used in a 10 L vat. The starter was DVI Christian Hansen starter TC20 (0.015% w/v) and the rennet was Maxiren (15L G-b). The setting time was 40 minutes. The coagulum was cut by hand with knives and the curd was treated with Neutrase, in an amount of 0.004 AU/kg, together with salt, at 2% (w/w), and the thus treated curd was pressed for 48 h.

EXAMPLE 3

Cheese was made in a similar manner to that of Example 2, except that reduced fat milk (2.4% w/w fat) was used and the curd was pressed for 16 hours.

EXAMPLE 4

Cheese was made in a similar manner to that of Example 2, except that gluconodelta lactone was added to the milk in place of starter and the milk then stirred for 5 minutes before the addition of Maxiren. The curd was pressed for 16 hours.

EXAMPLE 5

Cheese was made in a similar manner to that of Example 2, except that Amano A2 enzyme was added (0.004 AU/kg) and the curd pressed for 24 hours.

EXAMPLE 6

Cheese was made in a similar manner to that of Example 2, except that Neutrase was added at 0.0005 AU/kg.

EXAMPLE 7

Cheese was made in a similar manner to that of Example 2, except that Neutrase was added at 0.015 AU/kg and the curd pressed for 16 hours.

EXAMPLE 8

Cheese was made in a similar manner to that of Example 2, except that Neutrase was added to the milk prior to the addition of Maxiren (0.004 AU/10 L) and the curd was treated with 2% salt and pressed for 16 hours.

EXAMPLE 9

Cheese was made in a similar manner to that of Example 2, except that the curd with 1% (w/w) salt and the curd pressed for 24 hours.

EXAMPLE 10

Cheese was made in a similar manner to that of Example 2, except that the curd was treated with 3% (w/w) salt and 0.0005 AU/kg Neutrase.

EXAMPLE 11

Cheese was made in a similar manner to that of Example 2, except that the cheese was pressed for 3 hours.

The above Examples are summarised in the following Table 2.

TABLE 2

| xample | Milk Type | Starter type | Enzyme type | Enzyme level Au/Kg curd | Salt Addition % w/w curd | Press Time Hrs |
|---|---|---|---|---|---|---|
| 1 | CN:F 1.2:1 | Bulk | Neutrase | 0.01 | 2.20 | 16.00 |
| 2 | Full Fat | TC20 | Neutrase | 0.004 | 2.00 | 48.00 |
| 3 | 60/40 | TC20 | Neutrase | 0.00 | 2.00 | 16.00 |
| 4 | Full Fat | GDL | Neutrase | 0.004 | 2.00 | 16.00 |
| 5 | Full Fat | TC20 | Amano A2 | 0.004 | 2.00 | 24.00 |
| 6 | Full fat | TC20 | Neutrase | 0.0005 | 2.00 | 48.00 |
| 7 | Full Fat | TC20 | Neutrase | 0.015 | 2.00 | 16.00 |
| 8 | Full fat | TC20 | Neutrase | 0.004 added to milk pre-rennet | 2.00 | 16.00 |
| 9 | Full Fat | TC20 | Neutrase | 0.004 | 1.00 | 24.00 |
| 10 | Full Fat | TC20 | Neutrase | 0.0005 | 3.00 | 16.00 |
| 11 | Full Fat | TC20 | Neutrase | 0.015 | 2.00 | 3.00 |
| Control | Full Fat | TC20 | none | n/a | Cook/stretch/brine | n/a |

EXAMPLE 12

Two lots of 15 g grated Mozzarella cheese were placed evenly on two mini pizza bases (4" diameter). The pizzas were placed in an 800 watt microwave oven and heated for 25 seconds at full power. The pizzas were allowed to cool for 30 seconds, after which time a mounted needle was used to lift and stretch strands of mozzarella from the perimeter of the pizza. The stretch at break point was measured against a mounted scale. This was repeated 5 times for each pizza base and the average stretch recorded. The results are shown in Table 3, with the results being shown in millimeters and the originally measured value in inches (indicated by ") in the right-hand adjacent column.

TABLE 3

| Example | Day 1 | | Day 3 | | Day 7 | | Day 14 | | Day 21 | |
| --- | --- | --- | --- | --- | --- | --- | --- | --- | --- | --- |
| 1 | — | — | 381 | 15" | 304.8 | 12" | 457.2 | 18" | 457.2 | 18" |
| 2 | 254 | 10" | 457.2 | 18" | 457.2 | 18" | 381 | 15" | 482.6 | 19" |
| 3 | 254 | 10" | 355.6 | 14" | 482.6 | 19" | 381 | 15" | 508 | 20" |
| 4 | 254 | 10" | 431.8 | 17" | 406.4 | 16" | 508 | 20" | 279.4 | 11" |
| 5 | 228.6 | 9" | 381 | 15" | 381 | 15" | 482.6 | 19" | 304.8 | 12" |
| 6 | 228.6 | 9" | 228.6 | 9" | 482.6 | 19" | 482.6 | 19" | 431.8 | 17" |
| 7 | 101.6 | 4" | 228.6 | 9" | 431.8 | 17" | 355.6 | 14" | 355.6 | 14" |
| 8 | 279.4 | 11" | 381 | 15" | 482.6 | 19" | 381 | 15" | 406.4 | 16" |
| 9 | 127 | 5" | 330.2 | 13" | 457.2 | 18" | 279.4 | 11" | 482.6 | 19" |
| 10 | 76.2 | 3" | 127 | 5" | 355.6 | 14" | 279.4 | 11" | 304.8 | 12" |
| 11 | 76.2 | 3" | 152.4 | 6" | 254 | 10" | 431.8 | 17" | 381 | 15" |
| Control | 101.6 | 4" | 508 | 20" | 482.6 | 19" | 457.2 | 18" | 355.6 | 14" |

Thus, it can be seen that cheeses prepared in accordance with the present invention generally have about equivalent, and often better functionality than cheeses prepared by known methods.

What is claimed is:

1. A process for the production of a pasta filata cheese, wherein the plasticising step is omitted and replaced by treatment with a proteolytic enzyme in an amount and under conditions such as to impart stretching properties to the finished cheese, the enzymatic treatment being at the same time as or prior to any salting step.

2. A process for the production of a pasta filata cheese by fermenting milk with a starter culture, or by direct acidification, adding sufficient rennet to set the resulting curd, cutting, scalding and cheddaring the resulting coagulum, plasticising the cheddared product, and salting the plasticised product, wherein that the plasticising step is replaced by treatment with a proteolytic enzyme in an amount and under conditions such as to impart stretching properties to the finished cheese, the enzymatic treatment being at the same time as, or prior to, salting.

3. A process according to claim 1 or 2, wherein salting is effected at the curd stage, and the step of exposure to brine is omitted.

4. A process according to claim 1 or 2, in which the cheese is of the mozzarella type.

5. A process according to claim 1 or 2, in which the proteolytic enzyme is a proteolytic enzyme derived from *Bacillus subtilis*.

6. A process according to claim 1 or 2, in which the proteolytic enzyme is a proteolytic enzyme derived from *Aspergillus oryzae*.

7. A process according to claim 1 or 2, in which the treatment with the proteolytic enzyme is effected by adding the proteolytic enzyme to the milk.

8. A process according to claim 1 or 2, in which the treatment with the proteolytic enzyme is effected by adding the proteolytic enzyme to the curd.

9. A process according to claim 1 or 2, in which the treatment with the proteolytic enzyme is effected by adding the proteolytic enzyme to the curd with salt.

* * * * *